July 11, 1939.  G. H. CONNORS  2,165,538
SUPPORT FOR TRAILER VEHICLES
Filed April 25, 1938  4 Sheets-Sheet 1

Inventor
GEORGE H. CONNORS.
By Robb & Robb
ATTORNEYS

July 11, 1939. G. H. CONNORS 2,165,538
SUPPORT FOR TRAILER VEHICLES
Filed April 25, 1938 4 Sheets-Sheet 2

Inventor
GEORGE H. CONNORS.
By Robb & Robb
ATTORNEYS.

July 11, 1939.     G. H. CONNORS     2,165,538

SUPPORT FOR TRAILER VEHICLES

Filed April 25, 1938     4 Sheets-Sheet 3

Inventor
GEORGE H. CONNORS.

By Robb & Robb
ATTORNEYS

July 11, 1939.  G. H. CONNORS  2,165,538
SUPPORT FOR TRAILER VEHICLES
Filed April 25, 1938  4 Sheets-Sheet 4
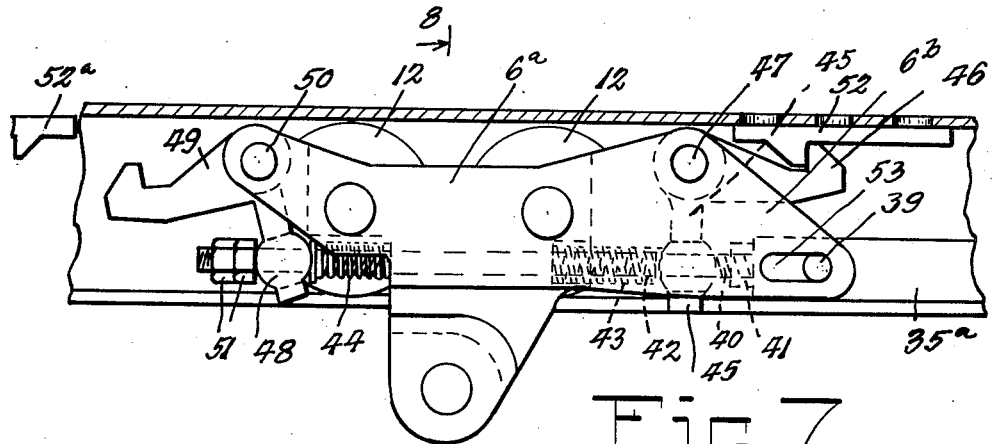
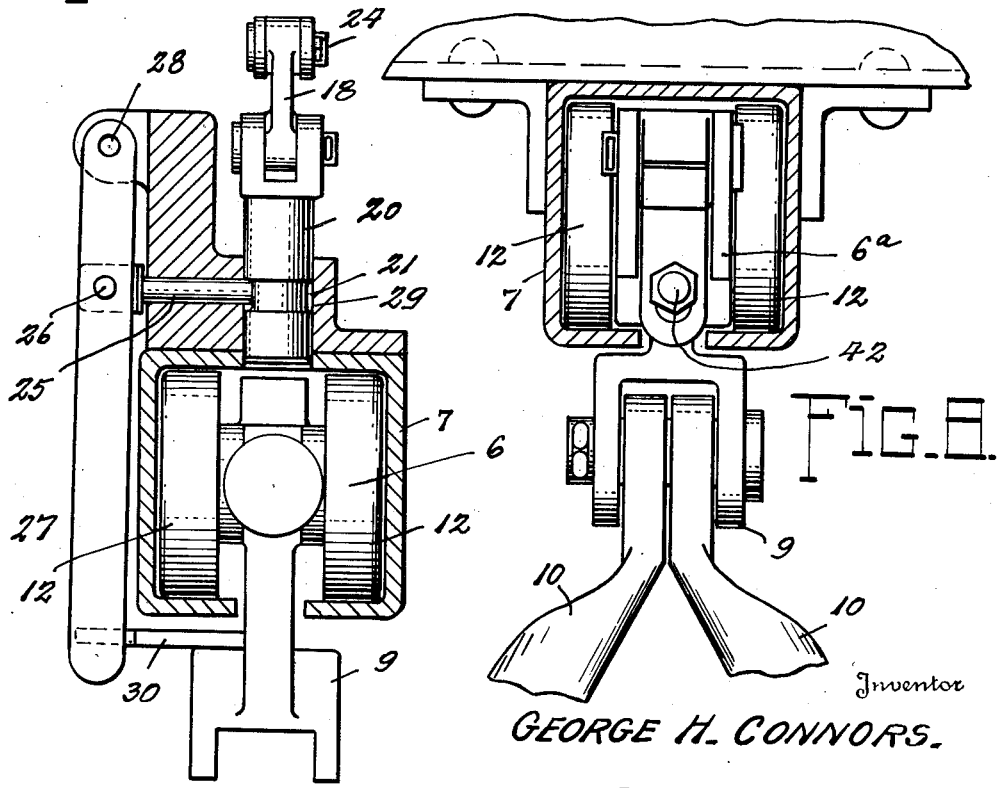

Patented July 11, 1939

2,165,538

UNITED STATES PATENT OFFICE 2,165,538

SUPPORT FOR TRAILER VEHICLES

George H. Connors, Edgerton, Wis., assignor to Highway Trailer Company, Edgerton, Wis., a corporation Application April 25, 1938, Serial No. 204,157

5 Claims. (Cl. 254—86)

This invention comprises certain novel operating and locking mechanism for supports of trailer vehicles. So-called semi-trailer vehicles today are equipped with main supporting and traveling wheels. The front end of the trailer is equipped with king pin means for detachable connection with the fifth wheel customarily carried by the pulling vehicle which is motor propeller and equipped with front and rear travel wheels. When the trailer is connected to the pulling vehicle, the front end of the trailer is of course supported by the fifth wheel means of the pulling vehicle. When the trailer is separated or disconnected from the pulling vehicle, a wheeled support with which the trailer is equipped near its front end is lowered so as to carry the weight of the forward portion of the trailer under the conditions stated. The said wheeled support is raised when the trailer is connected to the pulling vehicle and supported by the fifth wheel of the latter.

The invention deals with the said wheeled support and comprises novel mechanism for shifting the support downwardly to its supporting or operative position, and for moving said support upwardly to its inoperative so-called traveling position.

The novel operating means of the invention includes fluid controlled piston actuated devices, together with lock instrumentalities by which to positively lock the wheeled support of the trailer in its downward operative position and in its uppermost inactive position, the latter assumed when it is out of use.

The lock means of the invention takes two forms according to the embodiments hereinafter set forth, in that it comprises in one instance manually controlled lock devices, whereas in the other instance the lock devices are automatically actuated incident to the shifting of the wheeled support to its respective positions above mentioned, in which it is in use or out of use as the case may be.

In the accompanying drawings:—

Figure 1 is a side view of a trailer, portions broken away at one end and intermediate the chassis or frame, whereby to show partly in section and partly in elevation the shifting means for moving the support upwardly and downwardly, and the arrangement of the power cylinder which contains the fluid controlled piston that forms the motivating device to compel the movement of the support as desired. In this view dotted lines show the support in its inactive position and full lines show it in its operating position for use.

Figure 2 is a top plan view showing primarily the various features illustrated in Figure 1.

Figure 3 is an enlarged view showing primarily the guide housing in which the crosshead connected to the raising bar or link of the wheeled support, operates, same being partly broken away and shown in section, this view also illustrating the locking means for holding this crosshead in either of its forward or rearward positions assumed when the wheeled support is in use and when the said support is upraised out of use, respectively.

Figures 4 and 4a illustrate a top view of the arrangement shown in Figure 3. Figure 4a is merely a continuation of Figure 4, showing the right-hand portion of the instrumentalities as illustrated in Figure 3.

Figure 5 is a vertical cross-sectional view through the operating mechanism for the wheeled support, taken about on the line 5—5 of Figure 1 and illustrating the lock pin shown in its lowered operating position; also showing the relation of the trip cam on the crosshead by which the lock pins are released.

Figure 6 is a view similar to Figure 5 but showing the detent pin engaged in the groove of one of the lock pins whereby the said lock pin is maintained in unlocking position in respect to the crosshead.

Figure 7 is a view similar to Figure 3, but showing automatic locking mechanism in lieu of the manually controlled locking mechanism depicted according to the construction of Figures 1 to 6 inclusive.

Figure 8 is a cross sectional view taken on the line 8—8 of Figure 7 and bringing out more fully certain parts of the automatic locking mechanism, certain parts being shown in elevation.

Figure 1:
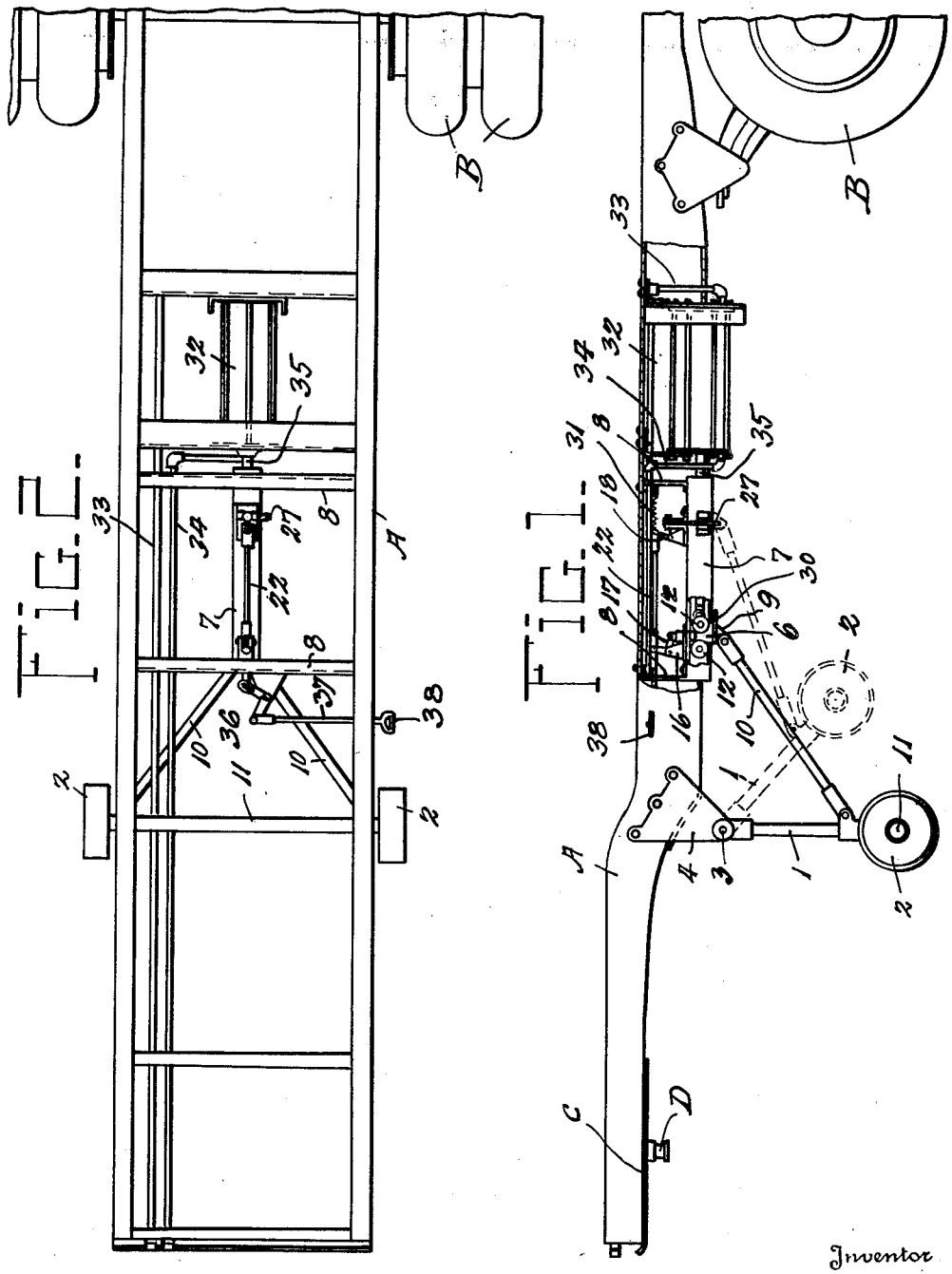
Figure 2:
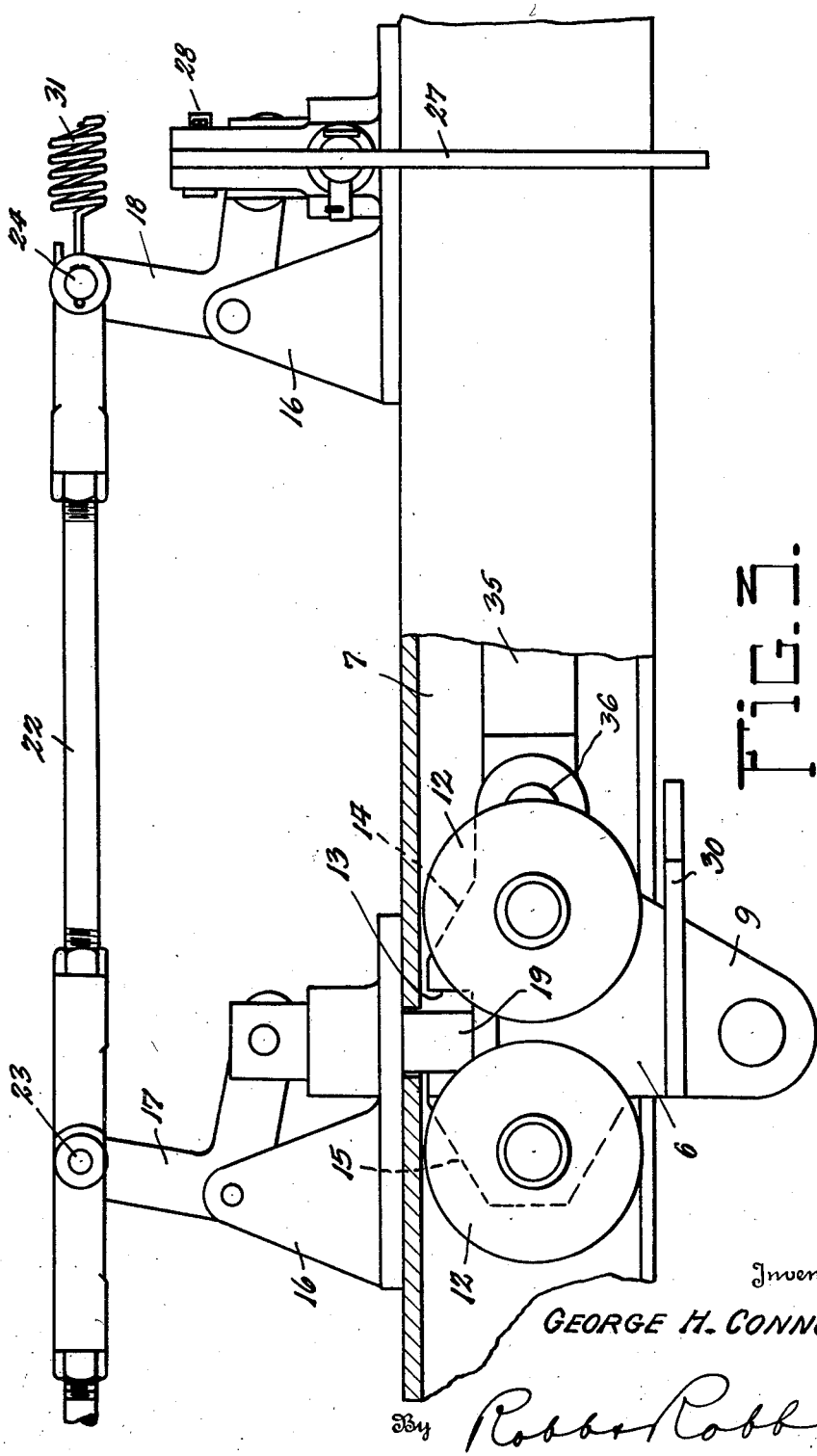

Since the general construction of the trailer and support means of my invention is well known to those conversant with this art, it may be very briefly described as follows: The front support of the trailer comprises a frame including vertical standards 1 carrying at the lower ends thereof the support wheels 2 and pivoted at their upper ends at 3 to brackets 4 upon the sides of the chassis or frame A of the trailer. The chassis A of the trailer is equipped at the rear end with the travel wheels B and at the front end with the usual fifth wheel C and king pin D. It is customary to move the support comprising the parts 1 and 2 upwardly and downwardly by means of a crosshead slidingly mounted to move longitudinally in guide means on the chassis A. According to the present invention, this crosshead, seen best in Figures 1 and 3, is designated 6 and is mounted in a guide housing 7 carried by suitable cross members 8 attached to the side members of the chassis A. Said crosshead 6 has a depending bracket 9, to which bracket are pivoted the upper ends of links or actuating bars 10, the arrangement of which actuating bars or links is best shown in Figure 8, so far as their upper ends are concerned. The members 10 converge at their upper ends and diverge at their lower ends, and at the latter are connected with the cross shaft or axle 11 that carries the rollers or wheels 2.

Referring more particularly to Figure 3, it is notable that the crosshead 6 is equipped with two pairs of rollers 12, seen best in Figures 5 and 6, which rollers travel on the bottom of the guide housing 7 as the head 6 is shifted longitudinally in the housing in forward and rearward directions respecting the axis of the chassis A. The lug or bracket 9 protrudes downwardly through a slot in the bottom of the housing 7 to its point of connection with the links or bars 10. At its upper portion the crosshead 6 is provided with a lock recess 13, and ramps 14 and 15 are formed on the upper side of the crosshead and incline upwardly toward the recess 13 for the purpose of providing surfaces up which lock pins may ride previous to entering the recess 13.

On top of the housing 7 are mounted brackets 16, to which brackets are pivoted the bell crank levers 17 and 18. The lower arm of the lever 17 is connected with a lock pin 19 and the lower arm of the lever 18 is connected to a similar lock pin 20 except that the latter lock pin, as shown in Figures 5 and 6, is formed with an annular locking recess 21 not provided on the lock pin 19, said recess for a purpose to be hereinafter described. The upper arms of the levers 17 and 18 are connected together by an adjustable rod 22 attached at the points 23 and 24 to the levers.

Referring now to the lever 18 which is connected to the pin 20, it is notable that the locking recess or groove 21 of the pin 20 is adapted to be interengaged by a detent pin 25 pivotally connected at 26 to a rocking lever 27. The lever 27 is pivoted at 28 to a bracket on top of the housing 7, which bracket is formed with a guide portion 29 in which the pin 20 is mounted to slide vertically. Actuating means for the detent pin 25 and lever 27 is provided in the form of a cam 30 mounted on the crosshead 6. A spring 31 is connected with one end of the rod 22 adjacent to the lever 18 and its normal tension is such as to tend to force the lock pins 19 and 20 downwardly to cause one of them to enter the locking recess 13 when the crosshead 6 has been moved to bring said recess into alignment with the said pins.

The means for operating the crosshead 6 in effecting the raising and lowering movements of the wheel support 1—2 may take various forms, but that illustrated comprises a vacuum system including the cylinder 32 having fluid or vacuum line pipes 33 and 34 connected to the rear and front ends thereof and leading to the front end of the chassis A so as to be connected up by flexible conduits with a control valve that is mounted upon the pulling vehicle. The operation of such a system is well known and it is only necessary to note that in the cylinder 32 is a suitable piston which is connected by a piston rod 35 with the crosshead 6, the piston rod leading through one end of the cylinder 32. Obviously, when the vacuum line 33 is connected with the rear end of the cylinder 32, the atmospheric pressure at the opposite end will force the piston in the cylinder rearwardly and cause raising of the support 1—2. The reverse operation is effected and causes lowering of the support to operative position when the vacuum line 34 is connected for application of the vacuum in communication with the front end of the cylinder 32.

Attached to the front end portion of the operating rod 22 is a bell crank lever 36 and attached to said lever at its forward arm is a pull rod 37 having a handle 38 and extending through the left side of the chassis A. The purpose of the parts 36, 37, and 38 will shortly appear in the description of the operation of the invention, which is as follows:

When the chassis A has been connected up by the coupling of its king pin D with the fifth wheel of the pulling vehicle, the trailer is of course ready to travel behind said pulling vehicle. The actual backing of the pulling vehicle into the trailer to do this coupling work elevates the front end of the trailer chassis A to remove the weight of the trailer and its contents from the wheeled support 1—2. The said support is now ready to be raised, and for this purpose the vacuum system is so controlled by the valve on the pulling vehicle as to apply the vacuum through the pipe 33 through the rear end of the cylinder 32 at the rear of the piston therein, thereby causing said piston to move rearwardly, exerting a pull upon the piston rod 35 and through said rod causing the crosshead 6 to slide rearwardly. This action shifts the wheeled support 1—2 to the dotted line or inactive position illustrated in Figure 1.

Since the crosshead 6, as illustrated by Figures 1 and 3, was locked in its downward adjustment or position by the lock pin 19 entering the locking recess 13, before the operator applies the vacuum to shift the crosshead 6 rearwardly, he must pull on the pull rod 37 at the handle 38 so as to move the rod 22 forwardly, rock the bell crank lever 17, and raise the lock pin 19 out of the recess 13 so that the head 6 is free to move rearward in the manner stated. When the pull rod 37 has been actuated in the manner stated to elevate the lock pin 19, the lever 18 and the lock pin 20 will have been correspondingly raised and as the lock pin 20 moves upwardly the detent pin 25 enters the groove or recess 21 and holds the two lock pins 19 and 20 elevated above their normal locking position of cooperation with the recess 13.

As the crosshead 6 approaches its limit of rearward movement, the cam 30 carried thereby engages the lever 27 on the inner edge of the latter and shifts the same outwardly, pulling the detent pin 25 in a like direction and thus releasing both of the lock pins 19 and 20 before the rearward movement of the head 6 is completed. Thus the lock pins are permitted to move downward and pin 20 will contact with the upper surface of the ramp 14 which is located near one end of the rod 35, as previously described. During the final rearward movement of the head 6 after the cam 30 has released the lock pins 19 and 20, the lock pin 20 will contact the upper surface of one of the ramps 14, and by action of the spring 31 will be caused to enter the locking recess 13 carried by the crosshead 6. The action of engagement of lock pin 20 in the recess 13 of the crosshead 6 is illustrated clearly in Figure 5 of the drawings. The pin 20 enters the locking recess 13 just as the piston in the cylinder 32 is about to reach the rear extremity of its movement and thus the support 1—2 becomes locked in its uppermost inactive position.

We will say now that the pulling vehicle and the trailer, with its chassis A, has reached its destination and it is desired to uncouple the two vehicles. For this purpose all that is necessary is for the operator of the vehicle to first pull on the handle 38 of the pull rod 37. This will raise the lock pins 19 and 20 and disengage the lock pin 20 from the recess 13 of the crosshead 6. Also, at this time the detent pin 25 will enter the groove or recess 21 of the lock pin 20 and hold the lock pins elevated temporarily. Thereupon, the operator of the pulling vehicle, by manipulation of the vacuum control valve, will admit vacuum, so to speak, to the front end of the cylinder 32 and the piston in the latter will move forwardly. Shortly after the rod 35 and piston aforesaid start moving forwardly, the cam 30 strikes the lever 37 subsequent to the shifting of the recess 13 and ramp 15 forwardly beyond said pin 20 and in this manner the detent pin 25 is withdrawn from the groove 21 of pin 20 and the two pins 19 and 20 drop down until the shoulder 20a of pin 20 contacts surface 20b. The support 1—2 is now being lowered by the forward movement of the piston and the rod 35 and the crosshead 6, and as the support approaches its lowermost position of Figure 1 the forward ramp 15 rides against the pin 19 and raises the latter along with the pin 20, not sufficiently to permit the detent 25 to enter the groove 21, but enabling the pin 19 to drop back into the recess 13 and effect its locking function in respect to holding the support 1—2 firmly locked in its lowermost operating position.

Passing now to the construction of the invention in Figures 7 and 8, it is notable that this construction embodies substantially the principles of action and structure found in the patent of Wagner, 2,016,468 issued October 8, 1935, but with some variation in the details of the construction of said parts. The purpose of the construction of Figures 7 and 8 is to do away with the necessity of the manual operation of such parts as the pull rod 37 and lever 36 in order to release the crosshead 6 from its locking means preliminary to the movement of the head in either the forward or rearward direction. In this modified automatic construction the piston rod is designated 35a. The parts in Figure 7 are shown as when the support 1—2, not illustrated, is in elevated or inactive position. On the rod 35a is carried a cross pin 39 which enters a slot in the bracket structure 6b of the crosshead 6a. This permits of a certain amount of movement of the rod 35a independently of movement of the head 6a itself. The rod 35a has connected therewith by threads 40 and a nut 41 an extension rod 42. This extension rod 42 passes through the head 6a and there are mounted on the rod coil springs 43 and 44 at the front and rear sides of the head 6a. The coil spring 43 has a bearing at one end against the head 6a and at its opposite end against the apertured lower portion of the arm 45 of a lock member 46 of somewhat bell crank form pivotally mounted at 47 on the head 6a.

In a similar manner to that last described, the spring 44 bears at one end against the front portion of the head 6a and at its rear end against the lower apertured end portion of the arm 48 of another lock 49 pivoted at 50 to the head 6a. Nuts 51 form abutments on the front end of the extension rod 42 engaging the said side of the arm 48.

With the parts in the position of Figure 7, the automatic lock means now being described operates as follows: The support 1—2, not shown in Figure 7, is elevated when the parts are arranged as in this figure and locked in elevated position by cooperation of the lock member 46 with a latch plate 52. The operator on the pulling vehicle admits vacuum, so to speak, to the front end of the cylinder 32. The piston in the cylinder moves forward with the piston rod 35a and the extension rod 42, the pin 39 riding forwardly in the slot 53 of the head 6a. The initial movement of the parts 35 and 42 in this manner causes the nut 41 to abut with the lower arm 45 of the lock member 46 and before the pin 39 reaches the forward end of the slot 43 the member 46 is disengaged or unlocked from the latch plate 52. Thereupon the pin 39, now abutting with the front end of the slot 53, pushes forwardly the crosshead 6a because the crosshead is now unlocked by the said action of the lock member 46.

As the crosshead 6a approaches the forward limit of its movement necessary to force downwardly the support 1—2 to its lowermost supporting position, the spring 44 will have become effective to raise the lock member 49 into the path of a forwardly disposed latch plate 52a and said lock member 49 will engage the locking lug of the latch plate 52a just as the support reaches its lowermost position, and thus automatically will lock the support in such position.

The forward movement of the extension rod 42 relatively to the head 6a previously described conditions the spring 42 and the lock member 49 to perform the locking action described. When the support 1—2 is locked in its downward position as stated, the pulling vehicle will be uncoupled from the trailer including the chassis A.

Upon again coupling the pulling vehicle with the trailer, when the vacuum is admitted to the rear end of the cylinder 32 in this automatic construction, the rod 35a and its extension rod 42 will be pulled rearwardly and this will rock the latch 49 downwardly out of engagement from the latch plate 52a incident to initial rearward movement of the parts 35a and 42 while the head 6a remains stationary. Then the head 6a, having become unlocked by the action of the member 49 being disengaged from the plate 52a, the further rearward movement of the parts 35a and 42 will cause the application of rearward force to the head 6a through the spring 44 and parts 48 and 51, and the head 6a will be shifted rearwardly until the support 1—2 is elevated to its inactive position, at which time the locking member 46 will again cooperate with the latch plate 52 and lock the support in such elevated inactive position.

It will be evident, therefore, that according to the construction last set forth, the actuating means for the support, which comprises the head 6a, will always be initially operated to unlock the support and its head 6a before the actual shifting of the member 6a and its supporting means, either upwardly or downwardly, commences.

Having thus described my invention, what I claim as new and desire to secure by Letters Patent of the United States, is—

1. Operating and locking mechanism for trailer supports, comprising a trailer, a support movably mounted on the trailer, shifting means on the trailer to raise and lower said support and comprising a head, operating means for moving the head forwardly and rearwardly on the trailer to lower the support and raise it, respectively, said head having a lock portion thereon, lock pins supported adjacent to the head and adapted to engage said lock portion of the head when the support is adjusted to either its lowered position or its raised position, instrumentalities to disengage either lock pin cooperating with the lock portion aforesaid to release the head therefrom, detent means for holding the lock pins temporarily in positions out of engagement with the lock portion, and a member on the head for automatically incapacitating the detent means to restore the lock pins to their operating positions incident to movement of the head.

2. Operating and locking mechanism for trailer supports as claimed in claim 1, in which the lock portion on the head comprises a lock recess, and inclined ramps at opposite sides of said recess disposed in line with the lock pins so that on movement of the head in opposite directions one or the other of the lock pins will ride up said ramps and enter the lock recess.

3. Operating and locking mechanism for trailer supports, as claimed in claim 1, wherein the lock pins are mounted to move rectilinearly of the movement of the head, combined with levers connected to the lock pins for moving same, a pull rod connecting the levers together for simultaneous operation, and spring means cooperating with the pull rod and normally tending to cause movement of the lock pins to enable them to engage the lock portion of the head.

4. Operating and locking mechanism for trailer supports, comprising a trailer, a support movably mounted on the trailer, shifting means on the trailer to raise and lower said support and comprising a head, operating means for moving the head forwardly and rearwardly on the trailer to lower the support and raise it, respectively, said head having a lock portion thereon, a pair of lock pins arranged to engage the lock portion aforesaid as the head reaches opposite limits of its movement, means for connecting the lock pins for simultaneous movement, a part normally tending to cause said lock pins to effect engagement thereof with the lock portion, a detent coacting with one of the lock pins for holding the same and its connected lock pin in an inactive position respecting the lock portion of the head, a member on the head for rendering said detent inoperative upon movement of the head in assuming its lowered or raised positions, and manual means for actuating the lock pins to disengage from the lock portion the particular pin which is coacting with the lock portion, and at the same time cause the lock pin aforesaid to cooperate with the detent to hold said lock pins temporarily incapacitated in reference to locking the head.

5. Operating and and locking mechanism for trailer supports, comprising a trailer, a support movably mounted on the trailer, shifting means on the trailer to raise and lower said support and comprising a head, operating means for moving the head forwardly and rearwardly on the trailer to lower the support and raise it, respectively, said head being provided with a lock recess therein and also provided with inclined ramps leading in opposite directions from said lock recess, separate lock pins so disposed that when the support is lowered one of them engages in the lock recess and when the support is elevated the other engages in the lock recess, a pull rod connected to the two lock pins for effecting disengagement of the one of them which may be disposed in locking engagement to the lock recess, a part for normally tending to engage the lock pins with the lock recess when the latter becomes aligned with either lock pin, each lock pin being adapted to ride up one of the ramps so as to enter the lock recess, dependent upon the direction of movement of the head, a detent pin associated with one of the lock pins, the latter lock pin having a lock groove to receive said detent pin, a spring actuated lever connected to the detent pin and normally tending to project the detent pin into the lock groove, and an operating cam on the head adapted to engage said spring actuated lever incident to movement of the head after the lock pins have been operated to be disengaged from cooperation with the lock recess, whereby to effect a movement of the said lever and the detent pin to release the lock pin with which the detent pin cooperates and permit the lock pins to move to a position ready to ride up a particular one of the ramps into the lock recess.

GEORGE H. CONNORS.